United States Patent [19]
Kim et al.

[11] Patent Number: 6,085,960
[45] Date of Patent: Jul. 11, 2000

[54] APPARATUS FOR MEASURING THE HEIGHT OF A SOLDER WAVE

[75] Inventors: Il-Jin Kim; Young-chan Park, both of Suwon, Rep. of Korea

[73] Assignee: SamSung Electronics Co., Ltd., Suwon, Rep. of Korea

[21] Appl. No.: 09/033,939

[22] Filed: Mar. 2, 1998

[30] Foreign Application Priority Data

| Mar. 4, 1997 | [KR] | Rep. of Korea | 97-6972 |
| Mar. 13, 1997 | [KR] | Rep. of Korea | 97-8429 |

[51] Int. Cl.[7] ........................................ B23K 3/00
[52] U.S. Cl. ............................ 228/37; 228/56.5; 118/713
[58] Field of Search ................................. 228/103, 8, 36, 228/37, 56.5, 56.1; 118/694, 712, 713; 427/8

[56] References Cited

U.S. PATENT DOCUMENTS

| 4,291,575 | 9/1981 | Frissora . | |
| 4,363,434 | 12/1982 | Flury . | |
| 4,529,116 | 7/1985 | Gutbier . | |
| 4,632,291 | 12/1986 | Rahn et al. . | |
| 4,736,780 | 4/1988 | Matsuo | 141/82 |
| 4,801,926 | 1/1989 | Bitetti | 340/624 |
| 4,889,273 | 12/1989 | Kondo . | |
| 4,921,156 | 5/1990 | Hohnerlein | 228/37 |
| 5,148,961 | 9/1992 | Humbert et al. . | |
| 5,388,468 | 2/1995 | Sasson . | |
| 5,533,663 | 7/1996 | Massini, Jr. et al. . | |
| 5,598,345 | 1/1997 | Tokura . | |
| 5,617,988 | 4/1997 | Willemen . | |
| 5,686,994 | 11/1997 | Tokura . | |

Primary Examiner—Samuel M. Heinrich
Attorney, Agent, or Firm—Robert E. Bushnell, Esq.

[57] ABSTRACT

A solder wave height measuring device is provided that may be constructed using a horizontal supporting member that is positioned on a set of conveyors. Perpendicularly attached to the horizontal supporting member is a graduated beam that slidably supports a measuring jacket. The jacket may have a cubic shape, drum shape, or any polyhedron shape, but the jacket will preferably have an upper surface that is perpendicular to the graduated beam to simplify taking visual readings. A surface of the measuring jacket is in contact with the top end of the solder wave to allow the measuring jacket to accurately indicate the height of the solder wave on the graduated beam. Additionally, a fastener can be used to fix the measuring jacket to the graduated beam. The measuring jacket is fixed to the graduated beam by a fastener when the measuring jacket indicates an optimum height to solder at maximum efficiency. This provides an easy and convenient measurement of the solder wave height. Additionally, the apparatus of the present invention is relatively economical due to its low manufacturing cost and simple assembly, the apparatus is easy to operate, few component parts are used, readings can be made visually without requiring operators to bend over into inconvenient positions, the apparatus can be easily maintained in an environment that does not have easy access to high technology components, and the apparatus is easy to operate, repair, and understand by less skilled workers.

21 Claims, 3 Drawing Sheets

APPARATUS FOR MEASURING THE HEIGHT OF A SOLDER WAVE

CLAIM OF PRIORITY

This application makes reference to, incorporates the same herein, and claims all rights accruing thereto under 35 U.S.C. §119 through my patent application entitled *Apparatus for Measuring a Height of Solder Spurted From a Soldering Apparatus* earlier filed in the Korean Industrial Property Office on Mar. 4, 1997 and Mar. 13, 1997, and there duly assigned Ser. No. 1997/6972 and 1997/8429.

BACKGROUND OF THE INVENTION

1. Field of the Invention

The present invention relates to a device for soldering printed circuit board assemblies and, more specifically, to an apparatus for measuring the height of a solder wave projected from the soldering vessel of an automatic soldering system and for maintaining the solder wave height at an optimum level to maximize the efficiency of the soldering process.

2. Background Art

Electronic products are often equipped with printed circuit boards (PCB) assemblies that have various components soldered and mounted onto the board. The automated fabrication of PCB assemblies has led to the development of automatic soldering systems to solder the PCB assemblies after additional components are inserted onto the board. The electrical components are mounted on the printed circuit board by inserting the leads of the components through apertures in the board from one side of the board. Projecting portions of certain leads that protrude through the board are then crimped over to secure the components on the board. The leads are then soldered to contact pads surrounding the apertures, and protective solder coatings are formed on conductor paths of the board, by passing the board assembly over a molten solder wave.

A molten solder surface tends to oxidize even when traveling in a molten solder wave and thus has an inherent high surface tension. Thus, as the printed circuit board assembly passes over the solder wave, unless a suitable fluxing agent is used, the molten solder in the solder wave tends not to separate between adjacent contact pads and conductor paths. This generates solder defects. As such, it is standard to spray a soldering flux on printed circuit board assemblies prior to their soldering.

An automatic soldering system may be constructed using conveyors that are installed, in spaced apart fashion, along the length of the automatic soldering apparatus. A printed circuit board having many additional components attached is transported by the conveyors during the soldering process.

A flux is applied by the automatic soldering system prior to soldering by transporting the printed circuit board so the bottom surface of the printed circuit board contacts the flux. The flux is unevenly applies over the bottom surface of the printed surface board using this method. Flux cleans the metal surfaces of the printed circuit board, prior to soldering, in the joint area by removing the oxide coating present. Additionally, flux also keeps the area clean by preventing the formation of oxide films and lowering the surface tension of the solder, thus increasing its wetting properties. A heater is installed next to the flux on the automatic soldering system. When the printed circuit board is transported over the heater by the conveyors, the printed circuit board is heated to a predetermined temperature. During the heating process, the flux that was applied to the bottom of the printed circuit board is melted. This causes the flux to evenly and thinly spread out over the bottom surface of the printed circuit board.

A soldering vessel is installed next to the heater in the automatic soldering system. The soldering vessel propels solder towards the bottom of the printed circuit board using air pressure. The propelled solder forms a solder wave that contacts the bottom of the printed circuit board. The air pressure that propels the solder may be generated by the revolutions of an impeller driven by a motor. The solder is applied to the bottom surface of the printed circuit board while the printed circuit board is transported over the soldering vessel by the conveyors.

The soldering efficiency of the automatic soldering apparatus depends on the height of the solder wave that is generated by the soldering vessel. It is important that the soldering process take place only on the underside of the object being soldered since the electrical components are attached on the other side of the printed circuit board assembly. The soldering wave must have a large enough height to make contact with the underside of the object being soldered and the soldering wave must also strike the underside of the printed circuit board with enough force to ensure a good soldering connection in hard to access locations. Thus accurate measurement of the solder wave is critical in an automated soldering process to ensure that good soldering connections are being made while avoiding soldering the top side of the printed circuit board assembly.

A solder wave height measuring apparatus may be constructed using a steel ruler to measure the height of a solder wave. The steel ruler is marked with graduations and is inserted into the melted solder contained in the soldering vessel. Then, the distance between the top of the soldering wave and the top surface of the soldering vessel is visually measured by reading the graduation that indicates the height H of the solder wave. The solder wave height is appropriately adjusted according to the difference between the desired solder wave height and the measured soldered wave height.

Some techniques for measuring the solder wave height and controlling automated solder operations are mentioned, for example, in U.S. Pat. No. 5,533,663 to Massini entitled *Solder Wave Measurement Device*, U.S. Pat. No. 5,617,988 to Willemen entitled Device for Measuring the Height of a Solder Wave, U.S. Pat. No. 4,363,434 to Flury entitled Continuous Soldering Installation, U.S. Pat. No. 4,291,575 to Frissora entitled Liquid Level Monitor, U.S. Pat. No. 4,529,116 to Gutbier entitled Methods of and Devices for Determining the Soldering Capability of a Solder Wave, U.S. Pat. No. 4,632,291 to Rahn entitled Automatic Wave Soldering Machine, U.S. Pat. No. 4,889,273 to Kondo entitled Soldering Apparatus, U.S. Pat. No. 5,148,961 to Humbert entitled Selective Wave Solder Apparatus, U.S. Pat. No. 5,388,468 entitled Solder Wave Parameters Analyzer, U.S. Pat. No. 5,598,345 to Tokura entitled Method and Apparatus for Inspecting Solder Portions, and U.S. Pat. No. 5,686,994 to Tokura entitled Appearance Inspection Apparatus and Appearance Inspection Method of Electronic Components.

Contemporary solder wave monitoring devices are technically complex, relatively expensive, and difficult to implement with low end automated manufacturing systems. I believe it may be possible to improve the art of solder wave height monitoring by providing a detecting device that has a relatively low cost, that is easy to operate, that uses few component parts, that readings can be visually made from without requiring operators to bend over into inconvenient positions, that can be easily maintained in an environment that does not have easy access to high technology components, and that is easy to operate, repair, and understand by less skilled workers.

SUMMARY OF THE INVENTION

Accordingly, it is an object of the present invention to provide an improved solder wave height measuring device.

It is another object to provide a solder wave height measuring device that simplifies the process of maintaining an optimum wave height.

It is still another object to provide a solder wave height measuring device that yields a convenient, rapid, and visual measurement of a solder wave height.

It is yet another object to provide a solder wave height measuring device that is economical to manufacture in low technology environments.

It is still yet another object still to provide a solder wave height measuring device that is easy to operate and does not require operators to bend over into inconvenient positions to take visual readings.

It a further object to provide a solder wave height measuring device that uses few component parts, thus making the device easily repairable in a low technology environment.

It is a still further object to provide a solder wave height measuring device that is easier to understand for less skilled workers.

To accomplish these and other objects, a solder wave height measuring device is provided that may be constructed using a horizontal supporting member that is positioned on a set of conveyors. Perpendicularly attached to the horizontal supporting member is a graduated beam that slidably supports a measuring jacket. The jacket may have a cubic shape, drum shape, or any polyhedron shape, but the jacket will preferably have an upper surface that is perpendicular to the graduated beam to simplify taking visual readings. A surface of the measuring jacket is in contact with the top end of the solder wave to allow the measuring jacket to accurately indicate the height of the solder wave on the graduated beam. Additionally, a fastener can be used to fix the measuring jacket to the graduated beam. The measuring jacket is fixed to the graduated beam by a fastener when the measuring jacket indicates an optimum height to solder at maximum efficiency.

The graduated beam may be constructed using a beam that is marked with predetermined graduations on a surface and perpendicularly connected to the horizontal supporting member. Guide blades are integrally formed from a unitary piece with the graduated beam and protrude from the sides of the graduated beam in a direction parallel to the length of the graduated beam. The predetermined graduations may be millimeters.

The measuring jacket may be constructed of a drum shaped, cubic shaped, or polyhedral shaped body that is slidably attached to the graduated beam. The measuring jacket has a chute that accommodates the graduated beam and allows the beam to be inserted into the measuring jacket. The chute does not fully traverse the jacket however, but rather terminates partially through the jacket leaving a recess in the jacket. In the bottom of the recess are perforations that allow the guide blades of the graduated beam to fully penetrate through the jacket. A surface contacting beam is movably fitted to the graduated beam so that the measuring jacket can be moved up and down along the length of the graduated beam. The surface contacting beam has one distal end in contact with the solder wave and a second distal end attached to the graduated beam. The surface contacting beam may be integrally formed from a unitary piece with the jacket. Additionally, the measuring jacket has a fastener hole formed in one side to fix the graduated beam in place using a fastener. A fastener may be any one of a screw, pin, rivet, or bolt.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
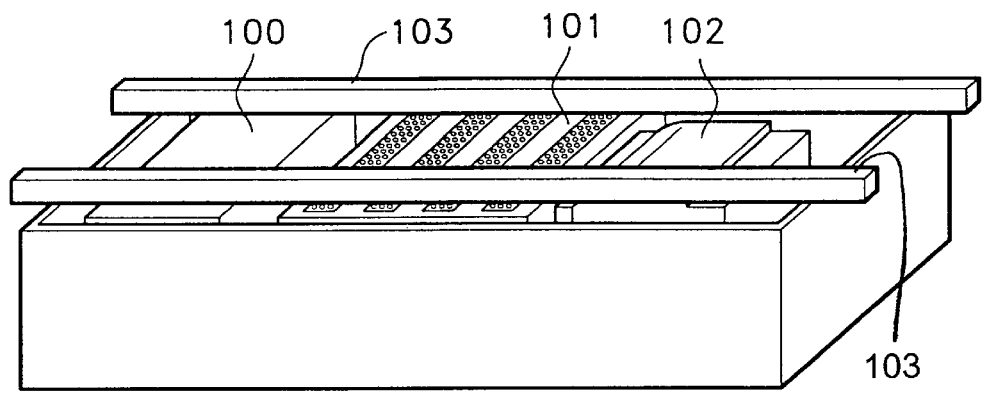
FIG. 1 is a schematic perspective view of an automatic soldering system.

Turning now to the drawings, FIG. 1 illustrates an automatic soldering system that is constructed using conveyors 103 that are installed, in spaced apart fashion, along the length of the automatic soldering system. Conveyors 103 are moved with predetermined pauses occurring during the soldering process. Printed circuit board 104 along with many additional attached components is transported by conveyors 103 through the soldering process.

Flux 100 is applied by the automatic soldering apparatus prior to soldering by transporting printed circuit board 104 so that the bottom surface of the printed circuit board contacts flux 100. Flux 100 is unevenly spread over the bottom surface of the printed surface board by this dipping or immersion method. Flux 100 cleans bottom surface 107 of printed circuit board 104 prior to starting the soldering process. Flux cleans the surfaces of metal in the joint area by removing the oxide coating present, by keeping the area clean through preventing the formation of oxide films, and lowers the surface tension of the solder, thus increasing its wetting properties. Heater 101 is installed next to flux 100 on the automatic soldering system. When printed circuit board 104 is transported over heater 101 by conveyors 103, printed circuit board 104 is heated to a predetermined temperature. During the heating process, flux 100 that was applied to bottom surface 107 of printed circuit board 104 is melted. This causes flux 100 to spread evenly and thinly over bottom surface 107 of printed circuit board 104.

Figure 2:
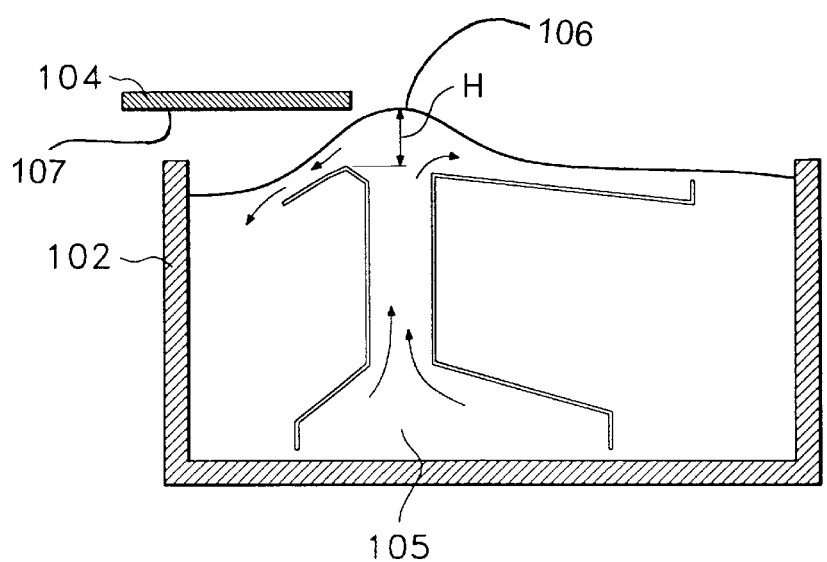
FIG. 2 is a schematic cross-sectional view of the soldering vessel of FIG. 1 and shows a printed circuit board that will be automatically soldered when the board passes over the solder wave generated by the soldering vessel.

Soldering vessel 102 is installed next to heater 101 on the automatic soldering system so that the solder can be applied after the flux has been spread out over the printed circuit board. The soldering apparatus propels solder towards bottom surface 107 of printed circuit board 104 using air pressure. The propelled solder forms a solder wave that contacts the bottom of the printed circuit board. The air pressure that propels the solder is generated by revolutions of an impeller driven by a motor (not shown). FIG. 2 is a cross sectional view of soldering vessel 102 of FIG. 1. The melted solder is propelled from soldering vessel 102 by air pressure to create solder wave 106. The solder is applied to bottom surface 107 of printed circuit board 104 while printed circuit board 104 is transported over soldering vessel 102 by conveyors 103.

The soldering efficiency of the automatic soldering apparatus depends on the height H of the solder wave 106 that is generated by the soldering vessel 102.

Figure 3:
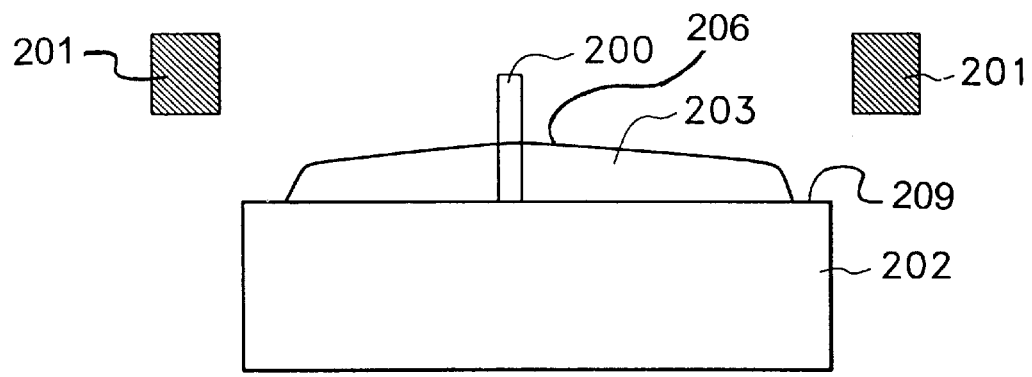
FIG. 3 is a schematic diagram of an apparatus that measures the height of a solder wave generated by an automatic soldering apparatus.

A solder wave height measuring apparatus used in an automatic soldering apparatus is shown in FIG. 3. A solder wave height measuring apparatus may use a steel ruler to measure the height H of a solder wave 106. The steel ruler 200 is marked with graduations and is inserted into the melted solder 203 contained in the soldering vessel 202. Then, the distance between the top of the soldering wave 206 and the top surface 209 of the soldering vessel 202 is visually measured by reading the graduation that indicates the height H of the solder wave 206. The solder wave height is appropriately adjusted according to the difference between the desired solder wave height and the measured soldered wave height.

Figure 4:
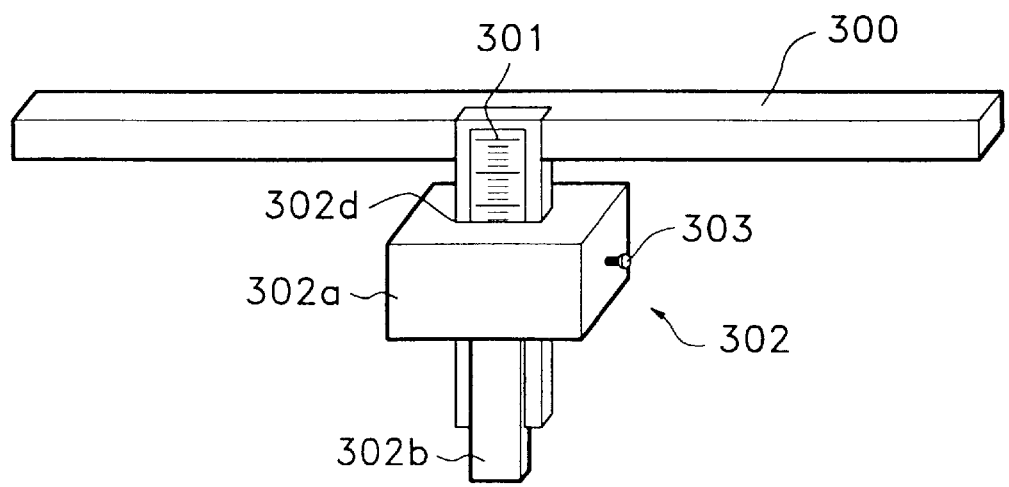
FIG. 4 is a schematic perspective view of an apparatus for measuring the height of a solder wave as constructed according to the principles of the present invention.
Figure 5:
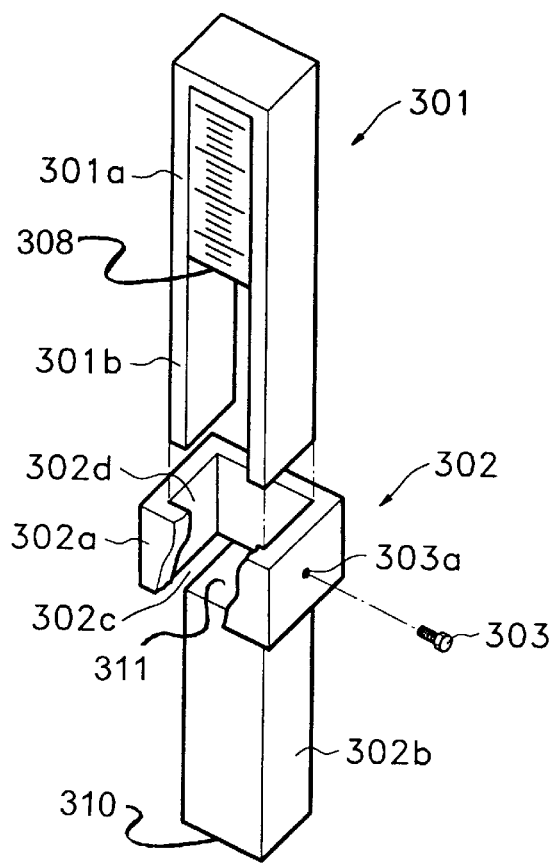
FIG. 5 is an exploded view of FIG. 4.
Figure 6:
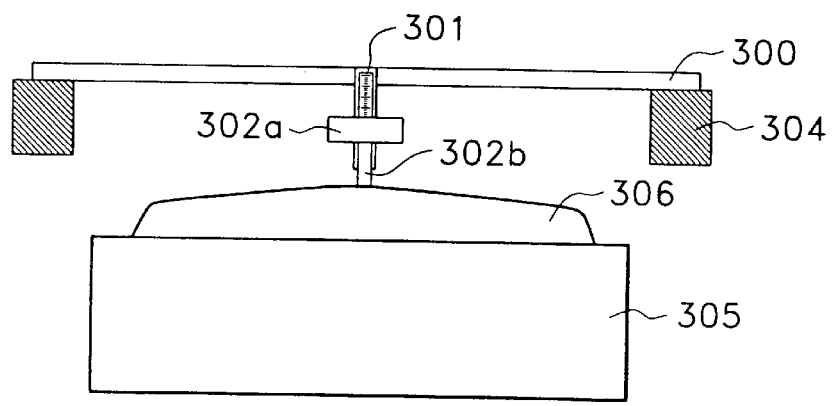
FIG. 6 is a schematic diagram of the apparatus of FIG. 4 as implemented with an automatic soldering system to measure the height of a solder wave.

FIG. 4 is a perspective view of an apparatus for measuring a height of a solder wave generated by a soldering vessel of an automatic soldering system apparatus as constructed according to the principles of the present invention. FIG. 5 is an exploded view of FIG. 4. FIG. 6 is a schematic diagram of the apparatus of FIG. 4 as applied to an automatic soldering system to measure the height of a solder wave.

Horizontal supporting member 300 is placed on conveyors 304 that transport the horizontal supporting member through the automatic soldering system. Graduated beam 301 is perpendicularly attached to horizontal supporting member 300. On a surface of the graduated beam 301, graduations are marked in millimeter, or similar, increments. Measuring jacket 302 is slidably fitted to graduated beam 301. Measuring jacket 302 can be moved up and down along the length of graduated beam 301. Measuring jacket 302 indicates the graduated mark on graduated member 301 that corresponds to the height of solder wave 306. Solder wave 306 is propelled from soldering vessel 305 so that an end of measuring jacket 302 contacts a top end of solder wave 306. Fastener 303 is used to fix measuring jacket 302 to a graduated mark on graduated beam 301.

Graduated beam 301 may be constructed using rectangular cylinder 301a that is marked with predetermined graduations on a surface and that is perpendicularly connected to the horizontal supporting member. Guide blades 301b are integrally formed from a unitary piece with graduated beam 301 and the guide blades protrude from sides of distal end 308 of graduated beam 301 in a direction parallel to the length of the graduated beam. The predetermined graduations may be millimeters.

Measuring jacket 302 may be constructed of a drum shaped, cubic shaped, or polyhedral shaped body that is slidably attached to graduated beam 301. Measuring jacket 302 has a chute 302d that accommodates graduated beam 301 and allows the beam to be inserted into measuring jacket 302. The chute does not fully traverse jacket 302 however, but rather terminates partially through the jacket leaving a recess 302d in the jacket. In the bottom of recess 302d are perforations that allow guide blades 301b of the graduated beam to fully penetrate through jacket 302. Surface contacting beam 302b is movably fitted to graduated beam 301 so that the measuring jacket can be moved up and down along the length of the graduated beam. Surface contacting beam 302b has one distal end 310 in contact with solder wave 306 and second distal end 311 attached to graduated beam 301. The surface contacting beam may be integrally formed from a unitary piece with the jacket. Additionally, measuring jacket 302 has fastener hole 303a formed in one side to fix graduated beam 301 in place using fastener 303. A fastener may be any one of a screw, pin, rivet, or bolt.

In operation, horizontal supporting member 300 is positioned on conveyors 304. The solder height measuring apparatus is then transported over soldering vessel 305 of the automatic soldering system as shown in FIG. 6. Fastener 303 that can fix the measuring jacket 302 to the graduated beam 301 is loosened. Then, measuring jacket 302 can be moved up and down along the length of graduated beam 301, while being guided by guide blades 301b.

Thus, measuring jacket 302 is vertically aligned until distal end 310 of surface contacting beam 302b is in contact with the top of solder wave 306, as shown in FIG. 6. At this time, the graduation on graduated beam 301 indicated by the measuring bracket 302a is read.

Once the optimum solder wave height is determined, fastener 303 is fastened into fastener hole 303a at the corresponding position on the graduated beam to point out the appropriate graduation mark. The fixing of the position of measuring jacket 302 simplifies the maintenance of the optimum solder wave height.

The apparatus for measuring the height of a solder wave as constructed according to the principles of the present invention allows an operator to read the graduation that indicates the height of the solder wave without lowering one's head down to read the graduation that indicates the height of solder wave 306. Furthermore, the graduation can be read outside of the automatic soldering apparatus. This provides an easy and convenient measurement of the solder wave height. Additionally, the apparatus of the present invention is relatively economical due to its low manufacturing cost and simple assembly, the apparatus is easy to operate, few component parts are used, readings can be made visually without requiring operators to bend over into inconvenient positions, the apparatus can be easily maintained in an environment that does not have easy access to high technology components, and the apparatus is easy to operate, repair, and understand by less skilled workers.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A system for automatically soldering a printed circuit board, said system comprising:
   a conveyor for transporting a printed circuit board through said system comprising:
     a means for applying a plurality of flux to a bottom surface of said printed circuit board;
     a heater melting and evenly spreading said flux over said bottom surface of said printed circuit board; and a soldering vessel containing a plurality of molten solder and propelling said molten solder toward said printed circuit board to form a solder wave;

a boom positioned on said conveyor and having a length dimension oriented perpendicularly to a direction of transport of said conveyor;

a beam perpendicularly attached to a center of said boom and having a plurality of graduated markings, said beam having a plurality of guide blades extending from a distal end of said beam and protruding parallel to a length of said beam;

a jacket slidably mounted onto said beam and movable along said length of said beam to indicate a particular graduation mark, said jacket having a recess for engaging said beam and having a plurality of perforations in an inner surface of said recess to allow said guide blades of said beam to penetrate said jacket, said jacket having a pole attached on a side opposite from said recess, said pole being located proximate to said perforations; and a distal end of said pole contacting said solder wave and pushing said jacket up along said beam to indicate one of said graduated markings that corresponds to said height of said solder wave above said soldering vessel.

2. The system of claim 1, further comprising:

a bore in a side of said jacket; and a fastener insertable in said bore to fastenably fix said jacket to said beam.

3. The system of claim 1, further comprised of said beam being a prism with a rectangular end and said beam being integrally formed with said guide blades from a unitary piece of material.

4. The system of claim 1, further comprised of said graduated markings being in millimeter increments.

5. The system of claim 1, with said conveyor transporting said printed circuit board with predetennined pauses.

6. The system of claim 2, further comprised of said fastener being any one of a bolt, rivet, and screw.

7. The system of claim 1, further comprised of said conveyor being two conveyor belts.

8. The system of claim 1, with said means for applying a plurality of flux being said conveyor transporting said printed circuit board through a flux bath.

9. A device for measuring a height of a solder wave propelled from a soldering vessel in an automatic soldering system, said device comprising:

a conveyor for transporting a printed circuit board through said automatic soldering system;

a boom positioned on said conveyor and having a boom length oriented perpendicularly to a direction of transport of said conveyor;

a beam perpendicularly attached to a center of said boom and having a plurality of graduated markings, said beam having a plurality of guide blades extending from a distal end of said beam and protruding parallel to a length of said beam;

a drum slidably mounted onto said beam and movable along said length of said beam to indicate a particular graduation mark, said drum having a recess for engaging said beam and having a plurality of perforations in an inner surface of said recess to allow said guide blades of said beam to penetrate said drum, said drum having a pole attached on a side opposite from said recess, said pole being located proximate to said perforations; and a distal end of said pole contacting said solder wave and pushing said drum up along said beam to indicate one of said graduated markings that corresponds to said height of said solder wave above said soldering vessel.

10. The device of claim 9, further comprising:

a bore in a side of said drum; and a fastener insertable in said bore to fastenably fix said drum to said beam.

11. The device of claim 9, further comprised of said beam being a prism with a rectangular end and said beam being integrally formed with said guide blades from a unitary piece of material.

12. The device of claim 9, further comprised of said graduated markings being in millimeter increments.

13. The device of claim 9, with said conveyor transporting said printed circuit board with predetermined pauses.

14. The device of claim 10, further comprised of said fastener being any one of a bolt, rivet, and screw.

15. The device of claim 9, further comprised of said conveyor being two conveyor belts.

16. A device for measuring a height of a solder wave propelled from a soldering vessel in an automatic soldering system, said device comprising:

a conveyor for transporting a printed circuit board through said automatic soldering system;

a boom positioned on said conveyor;

a beam attached to a center of said boom and having a plurality of graduated markings, said beam having a plurality of guide blades;

a drum slidably mounted onto said beam and movable along a length of said beam to indicate a particular graduation mark, said drum having a recess for engaging said beam and having a plurality of perforations in an inner surface of said recess to allow said guide blades of said beam to penetrate said drum; and a distal end of said drum contacting said solder wave and pushing said drum up along said beam to indicate one of said graduated markings that corresponds to said height of said solder wave above said soldering vessel.

17. The device of claim 16, with said guide blades extending from a distal end of said beam and protruding parallel to said length of said beam.

18. The device of claim 16, further comprised of said beam being a prism with a rectangular end and said beam being integrally formed with said guide blades from a unitary piece of material.

19. The device of claim 16, with said drum having a pole projecting from a side opposite from said recess, said pole being located proximate to said perforations, said distal end of said drum contacting said solder wave being an end of said pole.

20. The device of claim 16, with said conveyor transporting said printed circuit board with predetermined pauses.

21. The device of claim 16, further comprised of said conveyor being two conveyor belts.

* * * * *